United States Patent [11] 3,622,539

| [72] | Inventors | Donald E. Paul<br>Boxboro;<br>Richard A. Hebert, Chelmsford, both of<br>Mass. |
|---|---|---|
| [21] | Appl. No. | 801,784 |
| [22] | Filed | Feb. 24, 1969 |
| [45] | Patented | Nov. 23, 1971 |
| [73] | Assignee | Cabot Corporation<br>Boston, Mass. |

[54] STABILIZED POLYOLEFIN RESIN
COMPOSITIONS
7 Claims, No Drawings

[52] U.S. Cl. .................................................. 260/45.75 R,
260/41 B
[51] Int. Cl. ...................................................... C08f
[50] Field of Search ........................................... 260/41 B,
45.75, 94.9 D, 94.9 G; 242/300, 469

[56] References Cited
UNITED STATES PATENTS

| 2,351,624 | 6/1944 | Mavity .......................... | 252/469 |
| 3,079,366 | 2/1963 | Boyle et al. .................... | 260/45.9 |
| 3,300,329 | 1/1967 | Orsino et al. ................... | 260/41 |
| 3,365,439 | 1/1968 | Bjornson ....................... | 260/94.9 |
| 3,485,771 | 12/1969 | Horvath ........................ | 260/94.9 |

OTHER REFERENCES

Chemical Abstracts–Vol. 52, p. 15320 Article (a)– " Reactions Of TiO with Chromium Oxides" by Dietzel et al.
Journal of Materials Science– Vol. 3, (1968) pp. 229– 243– Articles by Bayliss et al.

Primary Examiner—Donald E. Czaja
Assistant Examiner—V. P. Hoke
Attorneys—Kenneth W. Brown, Arthur S. Collins, Barry R. Blaker and Lawrence E. Chaletsky ABSTRACT: This disclosure relates to the use of certain homogeneous chromium-oxide containing titanium dioxide reaction products as ultraviolet stabilizers for polyolefins.

STABILIZED POLYOLEFIN RESIN COMPOSITIONS

This invention relates to new and improved stabilized polyolefin resin compositions and to a process for stabilizing olefin polymers against the harmful effects such as degradation resulting from exposure to ultraviolet light. More particularly, this invention is concerned with novel resin compositions rendered resistant to deterioration and degradation caused by the influence of ultraviolet light as a result of the incorporation therein of a stabilizing amount of a homogeneous chromiumoxide-containing titanium dioxide reaction product.

Normally, olefin polymers such as polyethylene and polypropylene and copolymers thereof, which are widely used in the plastics industry, are quite suitable for fabricating articles such as cable sheathings intended for substantial outdoor usage. Unfortunately, however, olefin polymers and copolymers thereof are subject to deterioration and degradation in sunlight because of the presence of the ultraviolet light component thereof. Accordingly, it is customary to incorporate into the olefin polymer certain chemical additives, i.e., ultraviolet stabilizers, which effectively prevent the deterioration and protect the olefin polymer from the destructive action of sunlight.

Many methods have, heretofore, been carried out for converting the high energy, short wavelength ultraviolet radiation in sunlight to fairly low energy, long wavelength radiation which is harmless to the polymers. For example, materials which convert harmful ultraviolet radiation into harmless infrared radiation, such as carbon black, have been incorporated into the synthetic resins. A number of compounds that absorb ultraviolet light and reemit visible light have also been utilized as ultraviolet stabilizers for polymers. These compounds such as the hydroxybenzophenones, are able to accomplish the transfer of light energy by rearranging into a quinoid structure resulting in the emission or reradiation of absorbed energy having a lower frequency than the absorbed light.

In addition to affording protection against the effects of ultraviolet light, it is desirable that the ultraviolet stabilizer possess certain characteristics. Among these desirable characteristics is compatibility of the stabilizer with the resin system so as to avoid exudation resulting in the formation of a tacky spew or a solid bloom. The stabilizer must also be compatible with the resin system during processing to prevent its loss by a plating-out effect. Other desirable characteristics of an ultraviolet stabilizer include chemical stability, low manufacturing costs and low toxicity.

It is accordingly an object of this invention to provide improved thermoplastic resinous compositions.

It is a further object of this invention to provide novel polymer compositions comprising an olefin polymer and a homogeneous chromiumoxide-containing titanium dioxide reaction product.

A still further object is to provide new resinous compositions having desirable physical properties.

Other objects and advantages of the present invention will be apparent to those skilled in the art from the following detailed description and claims.

In accordance with this invention, it has been found that the above and still further objects are achieved by incorporating an olefin polymer and certain homogeneous chromiumoxide-containing titanuim dioxide reaction products.

Generally speaking, an amount of the above-mentioned homogeneous chromiumoxide-containing titanuim dioxide reaction product sufficient to stabilize an olefin polymer against deterioration resulting from exposure to ultraviolet light is added to the olefin polymer. More particularly, the stabilizer additive of the present invention is used in amounts of from about 0.01 to about 5 percent by weight based on the weight of the olefin polymer. However, it is preferred to use from about 0.1 to about 2 percent by weight based on the weight of the olefin polymer.

The term "olefin polymer," for which synthetic polymeric materials the products of this invention are effective as stabilizers, is intended and is used herein to encompass homopolymers of olefins having from 2 to about 10 carbon atoms, copolymers of such olefins and mixtures of olefin polymers. Thus, there may be employed olefin polymers such as polyethylene, polypropylene, poly (butene-1), poly (pentene-1), poly (3,3-dimethylbutene-1), poly(4,4-dimethylbutene-1), poly (octene-1), poly(decene-1), poly (3-methylbutene-1), poly (4-methylpentene-1), and the like. Said olefin polymers also include the copolymers of an olefin having from 2 to about 10 carbon atoms and at least one other ethylenically unsaturated monomer copolymerizable therewith wherein stabilization against ultraviolet light is essential. Exemplary of such copolymerizable monomers are vinyl halides such as vinyl chloride, vinylidene chloride, vinyl esters of carboxylic acids such as vinyl acetate, vinyl propionate, vinyl butyrate, vinyl benzoate, esters of unsaturated acids such as methyl acrylate, ethyl acrylate, propyl acrylate, butyl acrylate, allyl acrylate, and the corresponding esters of methacrylic acid; vinyl aromatic compounds such as styrene, ortho-chlorostyrene, para-ethyl styrene, vinyl naphthalene, dienes such as butadiene and chlorobutadiene; unsaturated amides such as acrylic acid amide and acrylic acid anilide; unsaturated nitriles such as acrylic acid nitrile; esters of alpha, beta unsaturated carboxylic acids such as the methyl, ethyl, propyl, butyl, amyl, hexyl, heptyl, octyl, allyl, methallyl and phenyl esters of maleic, crotonic, itaconic and fumaric acids and the like. In addition, resinous blends of homopolymers of olefins having from 2 to about 10 carbon atoms with other compatible polymers and blends of copolymers containing olefins having from 2 to about 10 carbon atoms with other compatible polymers are suitable for use with this invention.

The ultraviolet stabilizers utilized in the olefin polymer compositions of the present invention include homogeneous chromiumoxide-containing titanium dioxide reaction products wherein the chromium is present in amounts of from about 0.01 to about 0.09 percent by weight based on the weight of the titanium dioxide. In a preferred embodiment of the present invention, however, products comprising titanium dioxide containing chromium in amounts ranging from about 0.1 to about 0.5 percent by weight based on the weight of the titanium dioxide are employed as the ultraviolet stabilizers for the olefin polymers.

The homogeneous chromiumoxide-containing titanium dioxide reaction products of the present invention are readily prepared by methods well known in the art. For example, the homogeneous chromiumoxide-containing titanium dioxide reaction products may be obtained by reacting chromyl chloride with titanium tetrachloride in the presence of a hydrolysis flame composed of an appropriate mixture of hydrogen and oxygen. Another method for preparing the homogeneous chromiumoxide-containing titanium dioxide reaction products of this invention is disclosed in a series of two articles, each of which is entitled "Mixed Oxides Prepared With An Induction Plasma Torch," appearing in volume 3 (1968) of the "Journal of Materials Science" at pages 229 through 243. The method of preparation described in the articles entails essentially reacting chromyl chloride with titanium tetrachloride in the presence of a radiofrequency oxidizing plasma generated in an apparatus such as a radiofrequency plasma torch.

The stabilized olefin polymer compositions of this invention are readily prepared by mechanical methods. The olefin polymer as defined hereinbefore and the chromiumoxide-containing titanium dioxide reaction stabilizer are intimately admixed together on a conventional mixing machine of the type normally used for mixing rubber or plastics such as a mill roll, an extruder, a ball mill provided with a small number of balls, or a Banbury mixer. Preferably, the olefin polymer is first placed on a mill roll and after a small rolling bank has formed in the nip of the rolls, the stabilizing agent is added. The olefin polymer and the stabilizing additive can also be mixed together to form a crude admixture which is then placed on a mill roll. Regardless of the method by which the mixing of these materials is achieved, it is necessary that the materials be mixed together or worked under a sufficient heat and pressure to insure an efficient dispersion of the stabilizer in the olefin polymer so as to form a completely homogeneous resinous composition. The temperature at which this working or mastication is carried out is not critical, as long as the temperature is at least above the temperature where the olefin polymer fuses and below the temperature where decomposition occurs.

The invention will be more readily understood by reference to the following examples which describe the advantageous and unexpected results achieved by the use of the stabilizers of the present invention of olefin polymers. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

The following testing procedure is used in evaluating the physical properties and efficiency of the chromiumoxide-containing titanium dioxide reaction products of this invention as stabilizers for olefin polymers. A composition comprising a major amount of an olefin polymer and a stabilizer additive in an amount sufficient to protect the polymer from deterioration caused by exposure to ultraviolet light is mixed on a plastic roller mill to a homogeneous blend. The polymeric blend is then extruded into a flat sheet having a thickness of 75 mils which sheet is thereafter cut into square samples measuring 6 inches. The effects of the ultraviolet light component of sunlight upon the olefin polymer blends is then determined by placing the 6 inch square sample into a Weatherometer and studying the weathering effects over extended periods of time up to 500 hours. In the present instance, the samples, including those containing no stabilizer, are exposed in a Sunshine Carbon Arc Weatherometer Model XWR sold by Atlas Electric Devices Company of Chicago, Illinois. Each sample is subjected in the Weatherometer to a weathering cycle which entails exposure of each sample to 30 minutes of sunlight for each 30 minutes of water spray.

EXAMPLE 1

In accordance with the above testing procedure there is prepared a 6 inch square sample of an unstabilized polyethylene and a 6 inch square sample of a blend of a major amount of polyethylene and 2 percent by weight of the polyethylene of a chromiumoxide-containing titanium dioxide reaction product wherein the chromium is present in an amount of 0.31 percent by weight of the titanium dioxide (hereinafter designated as Sample A in table I). Moreover, for the purposes of comparison and to demonstrate dramatically the aspect of the homogeneous character of the stabilizers of the present invention in contrast to a more physical mixture, there is prepared and tested hereinbelow a 6 inch square sample of a blend comprising a major amount of polyethylene and 2 percent by weight thereof of a physical mixture of 0.45 grams of chromium oxide per 100 grams of titanium dioxide which corresponds to 0.31 percent of chromium by weight of titanium dioxide (hereinafter designated as Sample B in table I). Each of the samples is exposed in the Sunshine Carbon Arc Weathrometer for periods of time up to 500 hours to determine the effectiveness of the ultraviolet stabilizers of this invention in preventing surface cracking of the olefin polymer matrices. The results of the test are given in table I.

TABLE I

| Sample | Time, in hours | Condition |
| --- | --- | --- |
| Unstabilized Polyethylene | 500 | Severe cracking after 400 hours |
| A | 500 | No cracking |
| B | 500 | A marble-type pattern is developed |

EXAMPLE 2

Following the procedure of example 1, the homogeneous chromiumoxide-containing titanium dioxide reaction product is replaced in one instance with 2 percent by weight of a chromiumoxide-containing titanium dioxide reaction product wherein the chromium concentration is 0.1 percent by weight of titanium dioxide and then with 2 percent by weight of a chromiumoxide-containing titanium dioxide reaction product wherein the chromium is present in an amount of 0.75 percent by weight of the titanium dioxide. The stabilized resin compositions exhibit physical properties similar to those demonstrated in example 1. Similar results are obtained when the above stabilizers are compared at levels of 0.05, 1, 1.5, 3, 4 and 5 percent by weight based on the weight of the olefin polymer.

EXAMPLE 3

A stabilized composition is prepared in accordance with the procedure of example 1 wherein the polyethylene is replaced with an equivalent amount of polypropylene and 2 percent by weight of the polypropylene of a homogeneous chromiumoxide-containing titanium dioxide reaction product wherein the chromium is present in an amount of 0.31 percent by weight of titanium dioxide, is employed therewith. The results obtained on this composition indicate that the resultant thermoplastic resinous composition exhibits greater stability against the effects of ultraviolet light than compositions obtained from the resin in the absence of the stabilizer additive.

From the foregoing results it is evident that the stability against ultraviolet light of the compositions of this invention is notably superior to that of the unblended olefin polymers. In addition, it is found that other desired physical characteristics of the compositions of the present invention such as hardness, impact strengths and heat distortion temperatures, are not unduly affected by the incorporation of the stabilizer additives employed in the compositions may be of this invention.

For many purposes, it may be desirable to blend other conventional additives with the olefin polymer compositions of the present invention. For example, the properties of the resinous compositions may be modified by incorporating therewith an inert filler such as glass fibers, ground asbestos, mica and the like, dyes, pigments, plasticizers, reinforcing materials, extruding agents, extenders and the like. It will be apparent that compositions containing such other additives are within the scope of this invention. The compositions may readily be calendered to form smooth sheets and fabricated into shaped articles by conventional forming techniques, for example, by blow molding, injection molding, casting and extrusion.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A composition of matter having improved resistance to the harmful effects of ultraviolet light comprising an olefin polymer and as a light stabilizer for the composition a homogeneous chromium oxide-containing titanium dioxide reaction product wherein the chromium oxide is present in amounts of from about 0.01 to about 0.9 percent based on the weight of the titanium dioxide, said light stabilizer being present in an amount sufficient to improve the resistance of the composition to deterioration caused by exposure to ultraviolet light.

2. A composition as defined in claim 1 wherein said light stabilizer is present in amounts of from about 0.01 to about 5 percent based on the weight of said olefin polymer.

3. A composition as defined in claim 1 wherein said light stabilizer is present in amounts of from about 0.1 to about 2.0 percent based on the weight of said olefin polymer.

4. A composition as defined in claim 1 wherein said light stabilizer is a homogeneous chromium oxide-containing titanium dioxide reaction product wherein the chromium is present in amounts of from about 0.1 to about 0.5 percent based on the weight of the titanium dioxide.

5. A composition as defined in claim 1 wherein said olefin polymer is an ethylene polymer.

6. A composition as defined in claim 1 wherein said olefin polymer is polyethylene, and said light stabilizer is a homogeneous chromium oxide-containing titanium dioxide reaction product wherein the chromium is present in an amount of 0.31 percent based on the weight of the titanium dioxide, said light stabilizer being present in an amount of 2.0 percent based on the weight of said polyethylene.

7. A composition as defined in claim 1 wherein said olefin polymer is a propylene polymer.

* * * * *